July 22, 1924.  1,502,181
H. FINE
SELF WEIGHING SCOOP
Filed Aug. 20, 1923   2 Sheets-Sheet 1
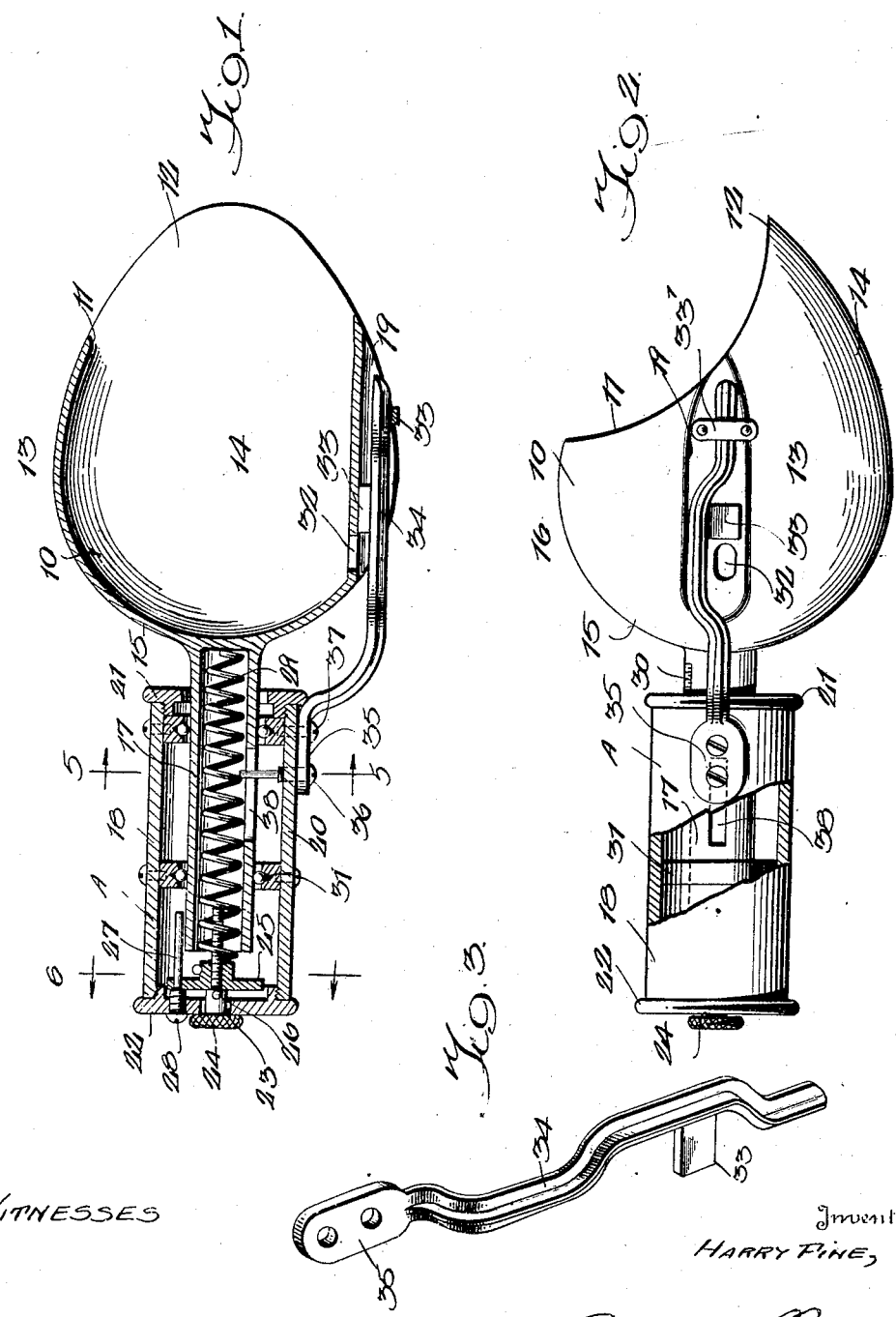
WITNESSES
Inventor
HARRY FINE,
By Richard B. Owen.
Attorney July 22, 1924.
H. FINE
SELF WEIGHING SCOOP
Filed Aug. 20, 1923
1,502,181
2 Sheets-Sheet 2
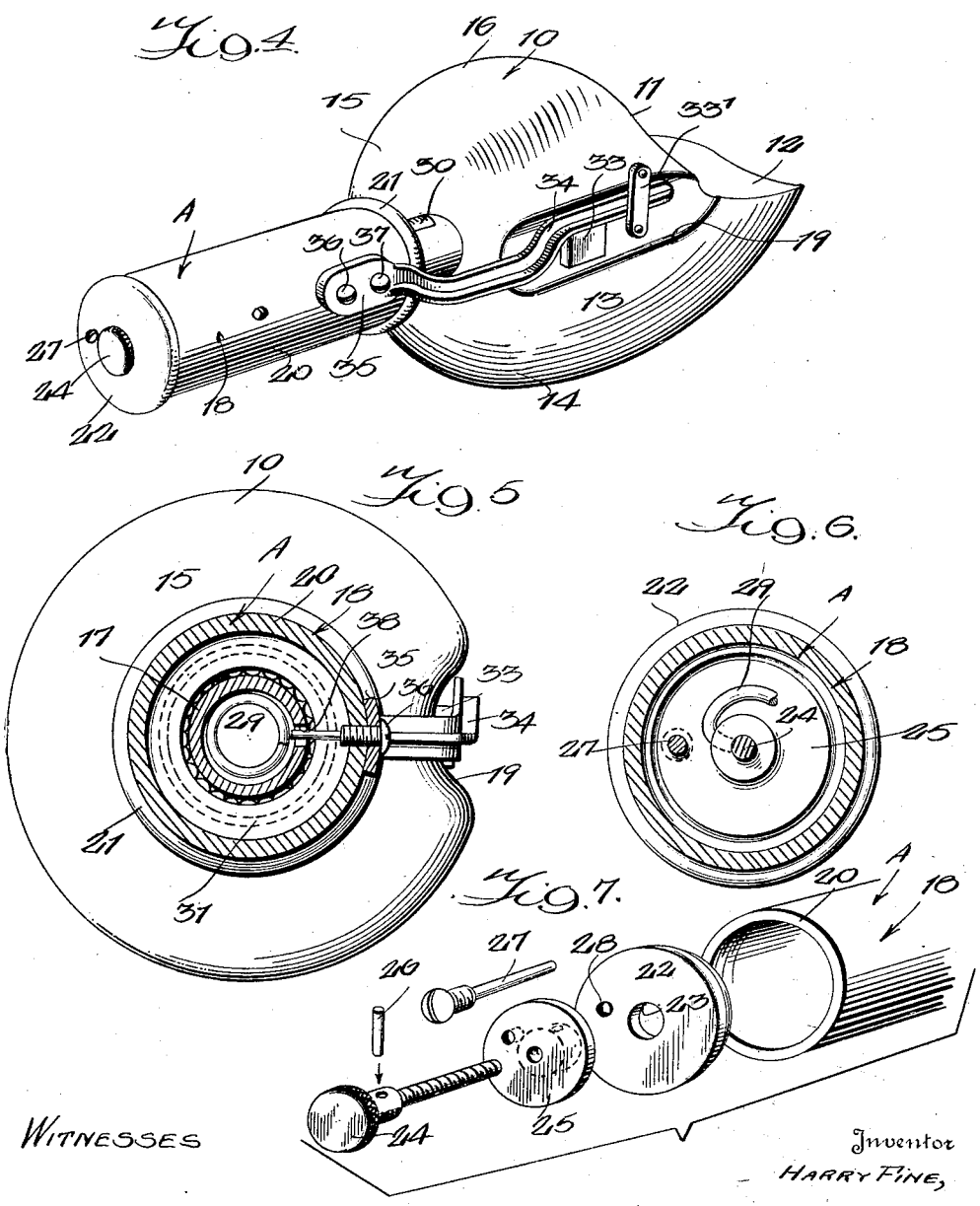

Patented July 22, 1924.

1,502,181

UNITED STATES PATENT OFFICE.

HARRY FINE, OF HARTFORD, CONNECTICUT.

SELF-WEIGHING SCOOP.

Application filed August 20, 1923. Serial No. 658,438.

*To all whom it may concern:*

Be it known that I, HARRY FINE, a citizen of the United States, residing at Hartford, in the county of Hartford and State of Connecticut, have invented certain new and useful Improvements in a Self-Weighing Scoop, of which the following is a specification.

This invention comprehends vital improvements in scoops having weighing means associated therewith, so that the person using the scoop can accurately determine the weight of the material contained in the scoop without the necessity of placing the same upon an extraneous scale or weighing machine, thereby effectively obviating the difficulties experienced with this procedure.

The primary object of the invention is the provision of a self weighing scoop embodying a body portion for receiving or scooping up the material, a handle for supporting the body having novel weighing means associated therewith for accurately determining the weight of the material contained in the scoop.

Another prime object of the invention is the provision of means for permitting the escape of the material contained in the body portion of the scoop through a suitable opening, if the material in the body is above the desired weight, and novel means for closing the opening automatically, after the escape of the desired amount of material from the body through said opening.

Another prime object of the invention is to provide novel means for adjusting the scoop or body portion of the device in relation to the weighing handle and closing gate for the opening, so that different amounts of material can be effectively weighed by said device.

A still further prime object of the invention is to provide an automatic weighing scoop of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described and claimed and illustrated in the accompanying drawings, in which drawings:

Figure 1 is a longitudinal horizontal section through the improved self-weighing scoop.

Figure 2 is a side elevation of the same showing parts thereof broken away.

Figure 3 is a perspective view of the gate carrying arm.

Figure 4 is a perspective view of the improved self-weighing scoop.

Figure 5 is a transverse section through the scoop taken on the line 5—5 of Figure 1 looking in the direction of the arrows.

Figure 6 is a transverse section through the scoop taken on the line 6—6 of Figure 1 looking in the direction of the arrows.

Figure 7 is a perspective view of the rear end of the scoop showing the various parts thereof prior to the assembling of the scoop.

Referring to the drawings in detail, wherein similar reference characters designate corresponding parts throughout the several views, the letter A generally indicates the improved scoop, which comprises the scoop body portion 10 for receiving the material to be weighed and sold. As shown the body portion 10 is of substantially an egg shape having its forward end cut away as at 11 to provide an entrance opening for the material and to define a scooping lip 12. This construction provides bowed side walls 13, a bottom wall 14, a rear wall 15, and a top wall 16. The rear wall 15 has formed thereon at the axial center thereof the rearwardly extending hollow shank 17, which slidably extends into the manipulating handle 18. One side wall 13 is provided with a pressed in guideway 19, for a purpose, which will be hereinafter more fully described. The hollow handle 18 includes a cylindrical open ended sleeve 20 which is preferably closed by inner and outer caps 21 and 22, which are preferably threadedly connected to the cylindrical sleeve 20. The inner cap 21 is provided with an enlarged axial opening for receiving the shank 17. The outer cap 22 is provided with a relatively small smooth axial opening 23 for the reception of the adjusting screw 24 which extends axially within the hollow shank 17. This adjusting screw 24 has threadedly mounted on the threaded shank thereof, the adjusting plate 25 for a purpose, which will be hereinafter also more fully described. In order to prevent displacement of the adjusting screw 24 from the cap 22 a suitable pin 26 is extended diametrically through the screw which engages the inner surface of the cap and it is obvious that longitudinal movement of the screw in relation to the cap 21 is prevented by the head of the screw and the pin 26. The adjusting disc or plate 25 is held against rotation with the screw, by means of a holding pin 27, which is threaded into cap 22, as at 28. It is obvious that by this construction, that during the rotation of the screw 24 that the plates 25 will be permitted to travel on the shank of the screw, the pin 27 permitting such longitudinal movement. A relatively heavy expansion spring 29 is arranged within the hollow shank 17 of the body portion 10 and engages the rear wall 15 thereof at one end and against the adjusting plate 25 at the other end. The shank 17 is also provided with any preferred type of scale 30 for facilitating the weighing of the material in the body portion 10.

In order to permit free longitudinal movement of the shank 17 within the hollow handle 18 suitable ball bearing races 31 are provided. These ball bearing races 31 are connected with the sleeve 20 of the handle 18 and the ball bearings therein engage the said shank 17.

In order to permit the escape of the material being weighed from the scoop, in case that too much material has been scooped up by the person using the scoop, one side wall 13 at the depressed guideway 19 thereof is provided with an outlet opening 32. This opening 32 is adapted to be closed by a gate 33 when the desired amount of material has been permitted to escape from the body 10 through said opening. This gate 33 is carried by an arm 34 which is slidably mounted within the guideway 19. The arm 34 is provided with an offset attaching shank 35, which is retained in place by screws 36 and 37. By referring to Figure 1 it can be seen that the screw 37 is also utilized for holding the forward ball bearing race in position, while the screw 36 is provided with an extended smooth shank for extension through a slot 38 formed in the hollow shank 17 which prevent rotary movement of the shank in the hollow handle.

The graduated scale 30, is preferably marked to show pounds and fractions thereof and the scoop is adapted to be used as follows: For instance if a customer desires a pound of sugar, or the like the adjusting screw 24 is rotated so as to adjust the tension of the spring 29 until the one pound graduation mark comes in alignment with the outer surface of the cap 21. This will of course position the opening 32 forwardly of the gate 33. The handle 18 is now grasped in the hand of the user and the body portion 10 is placed in the bin for scooping up the sugar or other material being sold. The scoop is now raised until the handle 18 and the body portion 10 assumes a vertical position and it is obvious that the body 10 is supported by the spring 29. Now if too much material has been scooped up, the spring 29 will be compressed a greater extent than desired and the body portion 10 will ride in toward the handle 18, which will position the opening 32 inwardly of the gate 33, which will allow the material to escape through the opening. As the material escapes through the opening the body portion of the scoop will gradually raise due to the influence of the spring 29 until the opening 32 rides in alignment with the gate 33, which will shut off the flow of the material and indicate that one pound of the material is in the scoop. The material can then be poured into a suitable container, as is the usual practice. If the material is being weighed which is of the formation that will not go through the opening 32, such as crackers, cake, or the like, it is very easy for the user of the scoop to take two or three of the crackers out until the opening 32 rides into alignment with the gate 33 which will indicate that the desired amount is in the body portion of the scoop.

The scoop is particularly adapted for weighing cakes or the like where persons desire a pound of mixed cakes, say four different kinds. The person weighing the cakes can accurately determine when he has a quarter of a pound of one kind of cakes in the scoop, and a quarter pound of the next and so on, so that an equal amount of different kinds of cakes can be had.

From the foregoing description, it can be seen that I have provided an exceptionally simple and compact self-weighing scoop which embodies a minimum number of parts.

Changes in details may be made without departing from the spirit or the scope of this invention.

What I claim as new is:

1. In a self-weighing scoop, a scoop body for receiving the material to be dispensed, a hollow shank formed on the scoop body, a hollow handle for slidably receiving the shank, an expansion spring engaging the scoop body at one end and the handle at its opposite end, the shank having a scale plate for cooperation with the inner end of the handle, and an escape opening formed in the body portion of the scoop, and a gate carried by the handle for closing said opening when the desired amount of material has been placed in said scoop body.

2. In a self-weighing scoop, a scoop body having an escape opening therein, a rearwardly extending shank formed on the body, a hollow handle slidably receiving the shank, an expansion coil spring having one of its ends engaging the body and its opposite end engaging the outer end of the handle, the shank having a graduated scale for cooperation with the inner end of the handle, a forwardly extending rigid arm carried by the handle, a gate carried by the arm for closing the escape opening in the body when the desired amount of material has been received therein, and means for initially adjusting the position of the escape opening in relation to the gate.

3. In a self-weighing scoop, a scoop body for receiving the material to be dispensed having a material escape opening therein, a hollow shank formed on the body, a hollow handle for receiving the shank, an expansion spring fitted within the shank having one of its ends arranged in engagement with the body for supporting the same, an adjustable screw carried by the outer end of the handle, an adjusting plate threaded upon the screw for supporting the outer end of the spring, the screw and plate forming means for adjusting the spring and body in relation to the handle, and a gate rigidly connected with the handle for closing the opening in the body, when the desired amount of material has been placed in the body.

In testimony whereof I affix my signature in presence of two witnesses.

HARRY FINE.

Witnesses:
MORRIS N. COHEN,
A. I. SCHWARTZ.